United States Patent [19]
Ford

[11] Patent Number: 4,672,624
[45] Date of Patent: Jun. 9, 1987

[54] CATHODE-BLOCK CONSTRUCTION FOR LONG LIFE LASERS

[75] Inventor: Carol M. Ford, Circle Pines, Minn.

[73] Assignee: Honeywell Inc., Minneapolis, Minn.

[21] Appl. No.: 764,269

[22] Filed: Aug. 9, 1985

[51] Int. Cl.⁴ .................. H01S 3/097; G01C 19/64
[52] U.S. Cl. .................................... 372/87; 356/350
[58] Field of Search ................. 356/350; 372/87, 88

[56] References Cited
U.S. PATENT DOCUMENTS

| Re. 27,282 | 2/1972 | Kolb ........................ 372/88 |
| 3,390,606 | 7/1968 | Podgorski ................... 372/33 |
| 3,614,642 | 10/1971 | Hochull et al. ............ 372/88 |
| 4,007,431 | 2/1977 | Abbink et al. ............. 372/88 |
| 4,473,297 | 9/1984 | Simpson et al. ............ 356/350 |

OTHER PUBLICATIONS

*New Hollow Cathode Glow Discharge*, by A. D. White, Journal of Applied Physics, vol. 30, No. 5, May, 1959.
*Cold Cathodes for Possible Use in 6328 Single Mode He-Ne Gas Lasers*, A Review of Scientific Instruments, vol. 36, No. 10, Oct. 1965.

*Primary Examiner*—Gene Wan
*Attorney, Agent, or Firm*—Robert A. Pajak

[57] ABSTRACT

A gas discharge device includes a block having one or more gas filled cavities or passageways along which the laser beams may propagate. Coupled to one of these passageways is an exit port which is coupled to a cathode mounted on an outer surface of the block. The exit port is formed so that the cross-section of the exit port decreases with distance from the outer surface of the block.

15 Claims, 6 Drawing Figures

CATHODE-BLOCK CONSTRUCTION FOR LONG LIFE LASERS

BACKGROUND OF THE INVENTION

The present invention relates generally to gas discharge devices, especially those utilized in ring laser angular rate sensors, and more particularly, to the block and cathode construction found in such assemblies.

Ring laser angular rate sensors are well known and are particularly described in U.S. Pat. No. 3,373,650, issued to Killpatrick, and U.S. Pat. No. 3,390,606, issued to Podgorski, both of which are assigned to the assignee of the present invention. The above referred to patents are incorporated herein by reference thereto.

Ring laser angular rate sensors of the type referred to utilize a block of material that is substantially stable, both thermally and mechanically. The block ususally includes a plurality of interconnected gas containing tunnels or passages which form a closed-loop path in the shape of a triangle, a rectangle, or any polygonal path. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, are sealed to the block to form a gas tight seal by any of a variety of techniques. The block is usually filled with a lasing gas such as a mixture of helium and neon. A sufficiently large electrical potential is applied between the anode and cathode to cause a discharge current therebetween which results in the production of a pair of counter-propagating laser beams within the block.

In some embodiments of ring laser angular rate sensors, a unitary body such as a quartz block, provides the gas discharge device including the optical closed-loop path. Such a system is shown in U.S. Pat. No. 3,390,606. Podgorski shows a unitary block, such as quartz or Cervit, comprised of a plurality of interconnected cavities or tunnels. Prior art ring laser angular rate sensors, like Podgorski, usually include at least one cathode and two anodes strategically positioned, usually symmetrically, along the optical closed-loop path. The pair of anodes and the cathode are electrically connected to a source of energy to produce a pair of electrical currents which flow in opposite directions along the optical closed-loop path. The current is established by the applied electrical potential between one cathode and one anode of sufficient magnitude to ionize the gas. As will be understood by those skilled in the art, a pair of anodes are symetrically placed along the closed-loop path of the laser beams so that gas flow effects caused by one of the electrical currents is balanced by gas flow effects caused by the other one of the electrical currents.

The performance of the cathode in ring laser angular rate sensors critically impacts the life of the sensor. In laser operation, the cathode attracts positive ions which bombard a generally metallic, electron emitting cathode surface, such as aluminum. The bombardment of the metallic cathode surface causes a sputtering effect which dislodges the electrically conductive material of the cathode surface. The sputtered material is attracted back to the cathode surface to create a metallic film thereon. As a consequence, the sputtered material tends to preferentially bury the neon gas between the cathode housing and sputtered film created thereon. This results in loss of the He-Ne gas from the cavity. A sufficient loss of lasing gas from the optical cavity results in the inability of the gas discharge device to operate resulting in the laser beams to cease lasing.

Present day research is directed to miniaturization of ring laser angular rate sensors. In such sensors, the optical path is a triangular or rectangular path where each path segment or side is in the order of one inch or less, and the thickness of the laser block is less than a one half inch. Accordingly, the laser block is relatively small compared with prior art laser blocks and contains a very limited amount of lasing gas. This latter fact, i.e. limited amounts of lasing gas, exacerbates the difficulty of achieving long life lasers.

Prior art cathode construction and gas laser techniques are described in U.S. Pat. No. 4,007,431, issued to Abbink, et al and U.S. Pat. No. 3,614,642, issued to Hochuli, et al. Also, such are described in a paper entitled, *New Hollow Cathode Glow Discharge*, by A. D. White, Journal of Applied Physics, Volume 30, No. 5, May, 1959, and a paper by Hochuli, et al, entitled, *Cold Cathodes for Possible Use in 6328 Single Mode He-Ne Gas Lasers*, A Review of Scientific Instruments, Volume 36, No. 10, October, 1965. Prior art cathodes as described in these and other patents and publications do not lend themselves to miniature lasers to achieve long life operation. This is so since the laser blocks are small and the sensor package needs to be kept small and of low weight.

BRIEF DESCRIPTION OF THE INVENTION

An object of the present invention is to provide a block-cathode construction suitable for gas discharge devices which provides a long life discharge device.

In the present invention, a gas discharge device includes a block having one or more gas filled cavities or passageways along which the laser beams may propagate. Coupled to one of these passageways is an exit port which is coupled to a cathode mounted on an outer surface of the block. The exit port is formed so that the cross-section of the exit port decreases with distance from the outer surface of the block. The cathode includes a housing having an outer mounting surface and a cavity extending inwardly or away from the mounting surface. The cathode is mounted on the block and positioned such that the cathode cavity is aligned with and surrounds the exit port. The cathode cavity and the exit port with its varied cross sectional dimensions are constructed so as to minimize current density at the surface of the cathode and provide good dispersion of positive ion flow from the exit port toward the cathode's electron emitting surface.

DETAILED DESCRIPTION OF THE INVENTION

Figure 1:
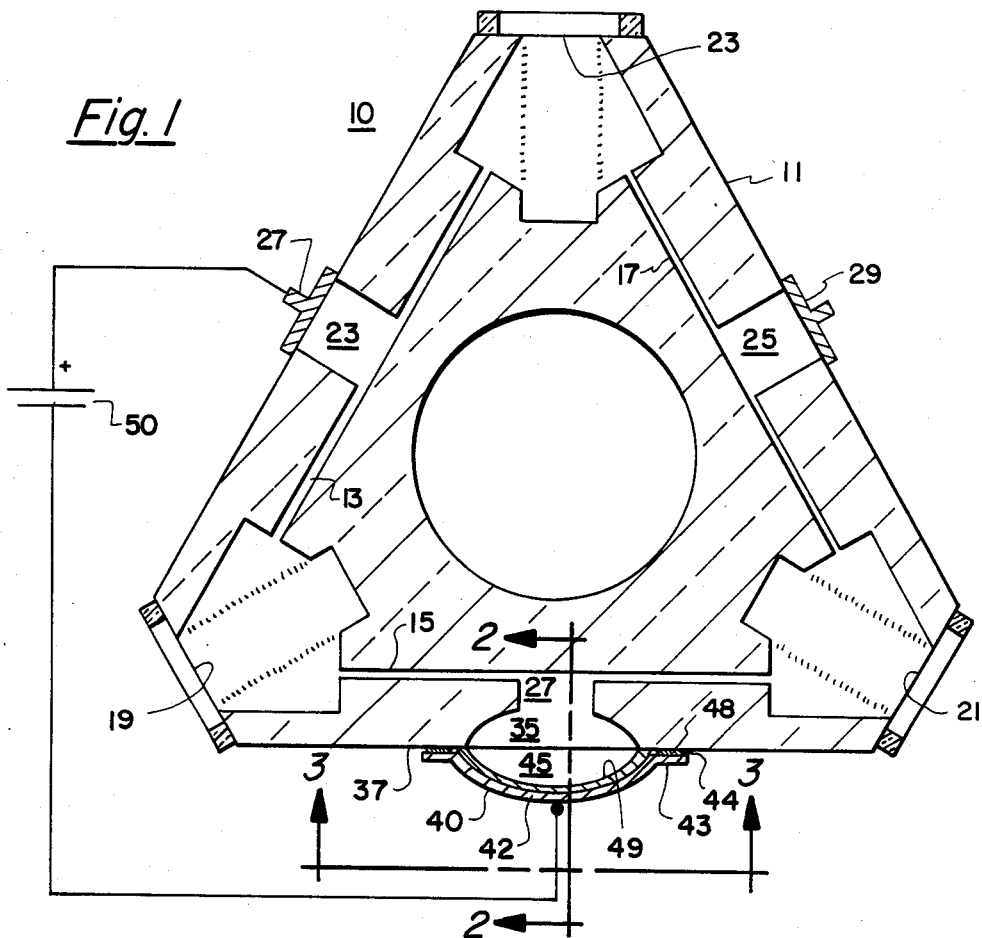
FIG. 1 is a cross-sectional view of a ring laser angular rate sensor.

Referring now to FIG. 1, there is disclosed a pictorial representation of a gas filled ring laser angular rate sensor 10 comprising a block 11 composed of BK-7 glass or the like. Alternatively, the laser block 11 could be made of quartz, Cervit, Zerodur, ceramic, or the like. A plurality of three interconnected tunnels 13, 15, and 17 are bored within block 11 at angles to each other to form a triangular shaped cavity. Mirrors 19, 21, and 23 are mounted on block 11 at the intersection of each of the tunnels 13, 15, and 17, respectively. Each mirror functions to reflect the light from one tunnel into the next thereby forming a closed-loop optical path.

A pair of anodes 27 and 29 are mounted on block 11 and adapted to communicate with laser tunnels 13 and 17 respectively, through interconnecting cavities 23 and 25, respectively. A quantity of lasing gas for plasma is adapted to be contained within the tunnels 13, 15, and 17. The gas may be inserted into the block cavities through one of the anode cavities used as a fill tube and an anode which also serves as a sealable port.

A cathode 40 is mounted on block 11 and in communication with the optical closed-loop cavity through interconnecting passage 27 and exit port 35. Passage 27 and exit port 35 are in communication with each other and permit gas to flow freely between tunnel 15 and cathode 40. Cathode 40 is symmetrically located relative to anodes 27 and 29, and tunnels 13, 15, and 17. The symmetrical location of the pair of anodes and cathode is intended to reduce gas flow effects which can adversely affect the performance of the rate sensor as is well known.

In operation, with a sufficiently large potential applied between the cathode and the anodes, a first discharge current is emitted from cathode 40 out into tube 15 toward mirror 19 and through tube 13 to anode 27. A second discharge current flows from cathode 40 out into tube 15 toward mirror 21 and through tube 17 to anode 29. These two discharge currents are usually controlled in intensity. The discharge current functions to ionize the lasing gas and thereby provide a pair of counter-propagating laser beams within the closed-loop optical cavity in a well known manner.

Block 11 is composed of low expansion material such as BK-7 glass. Cathode 40, particularly shown in FIGS. 1 and 2, comprises a dome shaped housing 42 composed of a nickel and iron alloy such as Invar or Kovar. Housing 42 includes a flange 43 for providing a mounting surface 44. Cathode 40 includes a cavity 45 inwardly extending from mounting surface 44. Cathode 40 is mounted on block 11 by use of an Indium solder seal 48 between flange mounting surface 44 and block surface 37. The Indium seal provides a gas tight seal between cathode 40 and block 11.

It should be noted that flange 43 and Indium seal 48 are presented as an exemplary mounting technique. The flange, of course, could be omitted depending upon the thickness of the housing. Further, ring laser 10 is shown as triangular shaped, but also may be any polygonal shape. Lastly, ring laser 10 may be part of what is known as a cube gyro where a single block contains a plurality of ring lasers sharing a common gas.

Cathode 40 is composed preferably of a material which has a thermal expansion coefficient that suitably matches the thermal expansion coefficient of block 11. The combination of a nickel-iron composistion cathode and BK-7 glass block has good thermal matching characteristics. The inner surface of cathode housing 42 which defines the cathode cavity is coated with a low sputtering electrically conductive material 49. Cathode cavity surface 49 serves as an electron emitting surface which forms in part the gas discharge device. The electrically conductive material is intended to be a low sputtering variety to avoid sputtering by positive ions in the gas discharge device. Two electrically conductive materials which satisfy the low sputtering requirement include aluminum oxide and beryllium.

Figure 2:
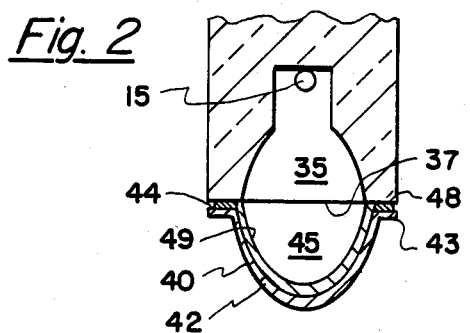
FIG. 2 is a is a cross-sectional view of cutting plane 2—2 of the block-cathode interface.
Figure 3:
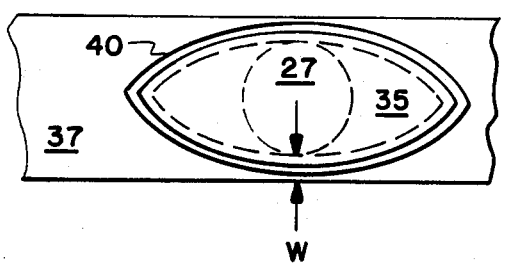
FIG. 3 is a side view of the cathode and block

The cathode cavity 45 of cathode 40 is positioned on block 11 to be in alignment with exit port 35 so as to be in communication with the lasing gas in tunnel 15 as aforesaid, and is particularly shown in FIGS. 2 and 3. In the present invention as particularly shown in FIG. 1, and specifically in detail 2—2, exit port 35 takes the form of a cavity or passage in block 11 such that the cross sectional area of exit port 35 decreases with distance from block outer surface 37. Cathode cavity 45 and the cavity of exit port 35 are illustrated in FIG. 3 as having ellipsoidal shapes.

Figure 4:
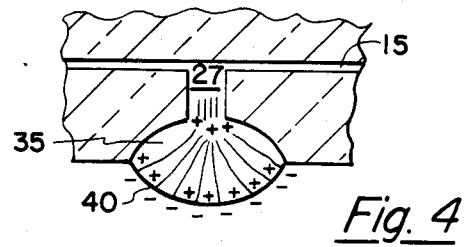
FIG. 4 is an expanded cross sectional view of a cathode and block structure showing positive ion flow.

FIG. 4 illustrates resulting positive ion flow using the block-cathode construction of the present invention with a potential applied between anodes 27 and 29, and cathode 40. Positive ions will tend to leave passage 27 and exit port 35, and flow into cathode cavity 45. With the ellipsoid shape of the cavity of exit port 35, the positive ions broadly disperse toward cathode cavity 45. This results in a low current density distribution at the cathode surface 49 when compared with the current density in passage 27. With the lower current density distribution provided here, there is less chance of cathode surface sputtering. Less sputtering results in long life lasers or gas discharge devices.

The ellipsoidal shaped exit port cavity 35, as illustrated in the accompanying drawings, is particularly suited for miniature glass lasers. This is particularly seen in FIG. 3. Glass laser blocks, particularly BK-7 laser blocks, should have a large as possible cavity wall thickness "W" to prevent block fracture and resulting laser failure.

An additional advantage of the present invention is that the increased dimensional space within the exit port allows for greater volume of gas within block 11. This is a particular concern as laser angular rate sensor blocks approach dimensions of less than one and a half inches on a side and ⅜ inch block thickness. In the preferred embodiment, applicant has obtained successful results with a triangular optical cavity of apprximately 0.8 inches on a side, laser tunnels of approximately 0.040 inches radius, and an elliptical exit port cavity having ellipsoid major and minor axes of 0.40 and 0.13 inches, and an elliptical cathode cavity having major and minor axies of 0.50 and 0.22 inches, respectively.

FIG. 1 shows the cavity of exit port 35 having first and second end portions where (i) the first end portion is the common interface with the outer block surface 37, and (ii) the second end portion forms a juncture with passage 27. It should be understood that passage 27 is not required, and that the second or inner end portion of the cavity of exit port 35 may form a juncture with tunnel 15 directly.

FIGS. 1-3 have illustrated an ellipsoidal shaped cathode cavity and exit port cavity. The ellipsoidal shaped cavities provide a control of cavity wall thickness as well as provide good ion dispersion. Other shapes are possible and are contemplated to be within the scope and spirit of the present invention. Such shapes may include a linearly tapered shape. Another example is illustrated in FIGS. 5a–b.

Figure 5A:
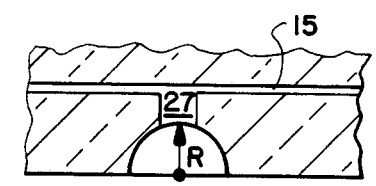
FIGS. 5a and 5b are a cross-sectional and a side view, respectively, of an alternative exit port cavity of the present invention.
Figure 5B:
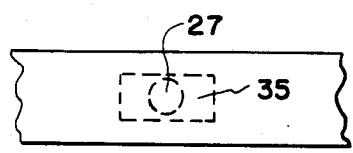

In FIGS. 5a–b, exit port 35 is shown cut into block 11 using a cutting wheel having a radius "R", such being low cost and practical from a manufaturing perspective. Further, a plurality of decreasing diameter counterbores may also be useful, but may not provide optimum current dispersion obtainable with formed cavities like that of of FIG. 1.

It should be understood by those skilled in the art that the cathode and exit port cavities as illustrated in the present invention may be alternatively shaped as otherwise set forth in the embodiments herein. While a specific embodiment of the invention has been described, it will be clear that variations of the details of construction which are specifically illustrated and described may be resorted to without departing from the true spirit and scope of the invention as defined in the accompanying claims.

The embodiments of the invention in which an exclusive property or right is claimed are defined as follows:

1. A gas discharge device comprising:
   a block having interconnected cavities forming at least a first passageway and an exit port for containing a gas and through which a gas discharge is to take place, said exit port having first and second end portions where said first end portion is in communication with said first passageway to permit the flow of gas therebetween, and said second end portion has a common interface with a first outer surface of said block, said second end portion having a cross-sectional area greater than said first end portion
   an anode in communication with said gas; and
   a cathode including a housing having a mounting surface and a cavity extending inwardly from said mounting surface, said cathode cavity having an inner surface composed of a low sputtering electron emitting material, and said mounting surface secured to said block outer surface to form a gas tight seal and positioned such that said cathode cavity is in communication with said second end portion of said exit port to permit gas flow therebetween.

2. The gas discharge device of claim 1 wherein said second end portion is tappered narrowly toward said first end portion.

3. The gas discharge device of claim 1 wherein said exit port is ellipsoidally shaped.

4. The gas discharge device of claim 3 wherein said cathode cavity is shaped to match said exit port cavity.

5. The gas discharge device of claim 4 wherein said cathode cavity is ellipsoidally shaped.

6. The gas discharge device of claim 1 wherein said cathode cavity is aligned with said second end portion of said exit port.

7. A ring laser angular rate sensor comprising:
   a block which is composed of a material which is substantially thermally and mechanically stable, said block having a plurality of interconnected tunnels for containing a gas and forming an optical closed-loop path cavity therein;
   at least one anode mounted on said block and in communication with said gas;
   a cathode including a housing having a mounting surface and a cavity extending inwardly from said mounting surface, said cavity having an inner surface composed of a low sputtering electron emitting material, and said mounting surface secured to said block outer surface to form a gas tight seal; and
   a connecting cavity within said block and in communication with at least one of said tunnels for passing said gas between said tunnels and said cathode, said connecting cavity having first and second end portions where said first end portion is in communication with said at least one of said tunnels to permit the flow of gas therebetween, and said second end portion has a common interface with a first outer surface of said block, said second end portion having a cross-sectional area greater than said first end portion, said cathode being positioned on said block to permit gas flow between said cathode cavity and said second end portion of said connecting cavity.

8. The sensor of claim 7 wherein said second end portion is tappered narrowly toward said first end portion.

9. The sensor of claim 7 wherein said connecting cavity includes an ellipsoidally shaped second end portion.

10. The sensor of claim 9 wherein said cathode cavity is shaped to match said second end portion of said connecting cavity.

11. The sensor of claim 10 wherein said cathode cavity is ellipsoidally shaped.

12. The sensor of claim 7 wherein said cathode cavity is aligned with said second portion of said connecting cavity.

13. In combination in a gas discharge device,
   an elongated gas discharge passageway formed in a block composed of substantially a thermally and mechanically stable material;
   an exit port coupled to said passageway, said exit port comprising an opening of increasing cross sectional area as it extends from said passageway to the surface of said block; and
   a cathode mounted on the surface of said block surrounding the surface opening of said port.

14. A gas discharge device having an elongated gas discharge passageway through which a gas discharge is to take place, an anode coupled to said passageway and a cathode coupled to said passageway by way of a port at a point displaced from said anode, said port having a variable cross sectional area of increasing magnitude as it passes from said passageway to said cathode, and said cathode having a cathode surface area greater than the cross-sectional area of said port.

15. A ring laser comprising:
   an elongated gas discharge passageway formed in a block composed substantially of a thermally and mechanically stable material and through which a bi-directional lasing action may take place;
   a pair of anodes positioned at displaced points along the length of said passageway;
   an exit port coupled to said passageway, said exit port being positioned between said anodes and having an opening of increasing cross sectional area as it extends from said passageway to the surface of said block; and
   a cathode mounted on the surface of said block and positioned to surround the surface opening of said exit port.

* * * * *